United States Patent [19]

Galensky et al.

[11] Patent Number: 4,665,545
[45] Date of Patent: May 12, 1987

[54] COMMUNICATION SYSTEM HAVING MULTI-MODE LINE SELECTION BUTTONS

[75] Inventors: Duane Galensky, Holmdel; Adrian A. Giuliani, Ocean Grove, both of N.J.

[73] Assignees: American Telephone and Telegraph Company, New York, N.Y.; AT&T Information Systems, Morristown, N.J.

[21] Appl. No.: 733,955

[22] Filed: May 14, 1985

[51] Int. Cl.[4] .............................................. H04M 3/56
[52] U.S. Cl. .................................... 379/158; 379/157; 379/159; 379/204
[58] Field of Search ............. 179/18 BC, 90 K, 18 B, 179/18 BG, 18 BH, 18 AD, 99 A, 99 LS, 99 LC, 99 R

[56] References Cited

U.S. PATENT DOCUMENTS

| 4,001,517 | 1/1977 | Bidlack et al. | 179/99 |
| 4,032,724 | 6/1977 | Matheny | 179/99 |
| 4,536,620 | 8/1985 | Wagoner et al. | 179/90 D |
| 4,595,800 | 6/1986 | Nagatomi et al. | 179/99 R |

Primary Examiner—James L. Dwyer
Attorney, Agent, or Firm—John A. Caccuro

[57] ABSTRACT

A communication system includes station sets having one or more function enable buttons and a plurality of line access buttons. The function enable buttons include the extension, transfer and send message buttons. Each line select button is associated with a communication line and with the station set associated with that line. Operation of a function enable button initiates the feature associated with that button and also changes the function of a line select button from a line access button to an auto-dial select button for dialing the station associated with the line select button.

13 Claims, 7 Drawing Figures

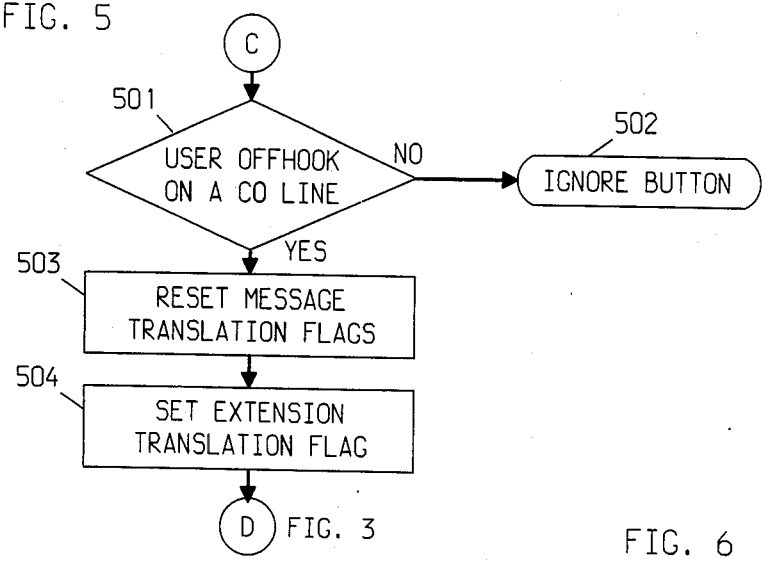
FIG. 5
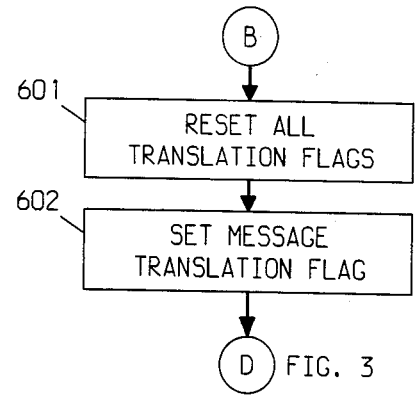
FIG. 6
FIG. 7
LINE-TO-STATION TRANSLATION TABLE
| LINE | STATION | CO NO. |
|------|---------|--------|
| 01-A0 | 10 | 3860 |
| ⋮ | ⋮ | ⋮ |
| 05-A4 | 14 | 3864 |
| 06-B0 | 15 | 3865 |
| ⋮ | ⋮ | ⋮ |
| 10-B4 | 19 | 3869 |
| 11-C0 | 20 | 3870 |
| ⋮ | ⋮ | ⋮ |
| 15-C4 | 24 | 3874 |
| 16-D0 | 25 | 3875 |
| ⋮ | ⋮ | ⋮ |
| 20-D4 | 29 | 3879 |

COMMUNICATION SYSTEM HAVING MULTI-MODE LINE SELECTION BUTTONS

FIELD OF THE INVENTION

This invention relates to a telephone communication system and, more particularly, to providing a direct station selection capability at a station set using line access buttons.

BACKGROUND OF THE INVENTION

In telephone communication systems the direct station selection (DSS) feature enables an attendant to access other stations of the system by merely pressing a button associated with that station set. In prior art telephone communication systems the DSS feature is typically provided using a separate group of buttons located on the attendant station set or on an adjunct associated therewith. However, such DSS feature implementations require a separate button for each station which is to be directly selected.

SUMMARY OF THE INVENTION

According to the present invention, a station set of the communication system has a function enable button which when pressed changes the function of line select buttons of the station set from a line access to an auto-dial station select function. More particularly, the console station set includes one or more function enable buttons for enabling different system features and a plurality of line select buttons each associated with a communication line and the station set of that communication line. A system feature having an auto-dial station select capability is enabled by first pressing the function enable button associated with that feature and then pressing the line select button associated with the station to be called. The normal line select function remains unchanged and is activated by pressing only a line select button.

According to the present invention an extension, transfer and send message button are defined as function enable buttons. When the extension button is pressed it enables the line select buttons to be used as station select buttons to initiate calls to other station sets. The conferencing of additional stations to an existing call is accomplished by pressing the conference button, the extension button and then the line select button associated with the station to be added to the call.

The call transfer button and the send message button are utilized in conjunction with the line select button to establish, respectively, a call transfer to and message waiting indication at a station set of the system.

BRIEF DESCRIPTION OF THE DRAWING

The characteristics and operation of the present invention will be more apparent from the following detailed description taken in conjunction with the drawing in which:

FIGS. 4, 5 and 6, show, respectively, the flow chart of the software sequences which enable the call transfer, extension dialing and send message features of the present invention; and FIG. 7 shows a line-to-station translation table used with the present invention.

DETAILED DESCRIPTION

Figure 1:
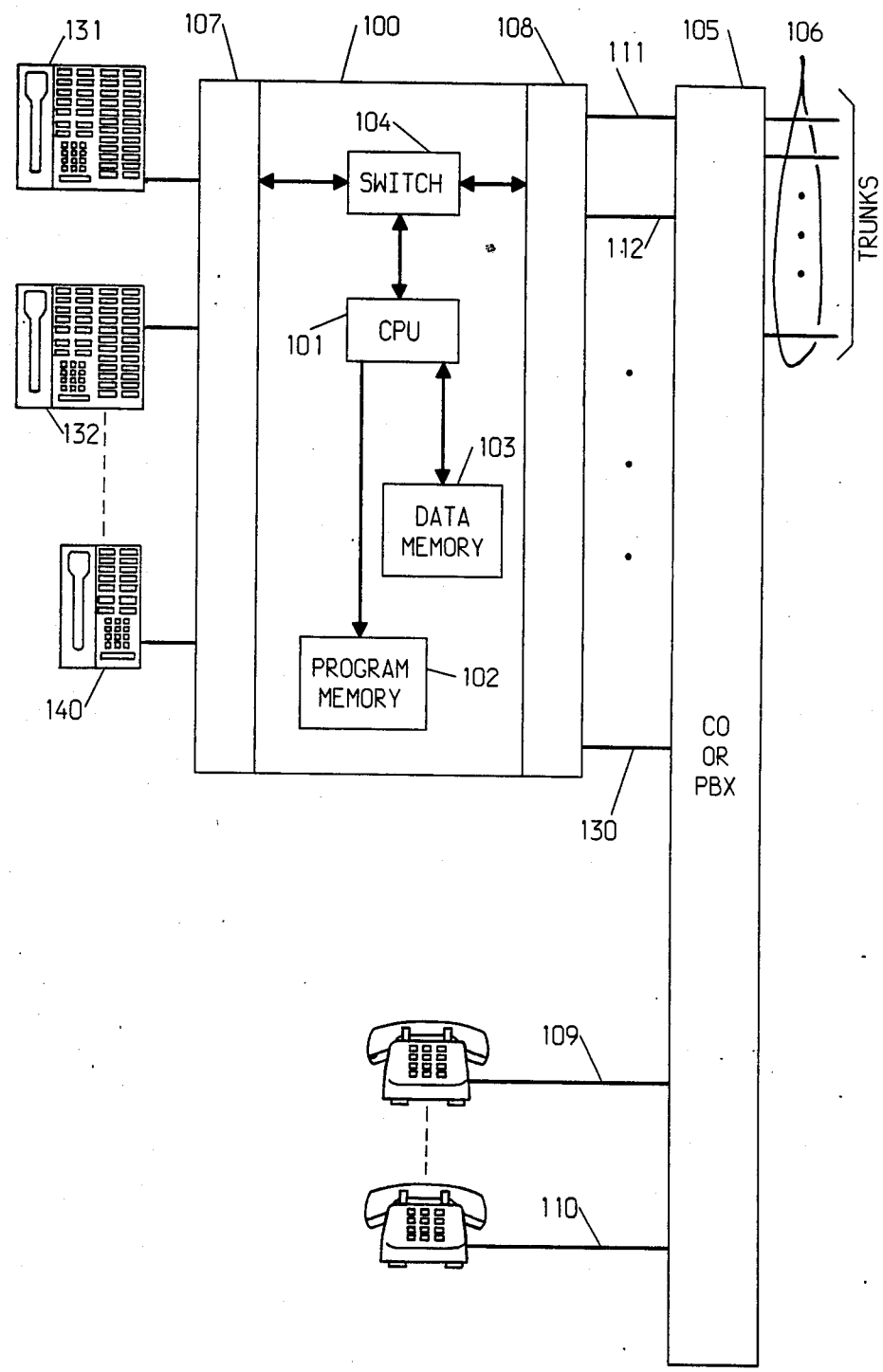
FIG. 1 is a block diagram of a telephone communication system useful for describing the present invention.

Shown in FIG. 1 is an illustrative block diagram of a communication system useful for describing the operation of the present invention. The system includes common control unit 100 which connects to one or more central office (CO) Centrex or PBX lines, such as 111-130, via interface 108, and which connects to two or more station sets, such as 131-140, via interface 107. The CO or PBX 105 includes trunks 106 and additional station sets 109, 110. Station sets 131, 132 may be attendant station sets which have more buttons than station 140.

Control unit 100 establishes and controls all intercom and CO or PBX line communications. Control unit 100 includes switch 104, central processor unit (CPU) 101, program memory 102 and data memory 103. Program memory 102 provides instructions to CPU 101 for controlling switch 104 and interface units 107, 108 to enable the various operating features and functions of the system. Data memory 103 is utilized by CPU 101 for storing and accessing data associated with performing the various functions and features programmed in program memory 102. In the preferred embodiment CPU 101 is a microprocessor, program memory 102 is read-only-memory (ROM), and data memory 103 is random access memory (RAM). The interface circuits 108 and 109 may include well known circuitry such as ring detector, switching matrix, network control, line circuits, and other circuitry required by the system to establish, maintain and terminate communications. One communication system which may embody the present invention utilizes interchangeable program cartridges to supplement program memory 102 and data memory 103, and is described in the copending U.S. Patent application Ser. No. 445,982, now U.S. Pat. No. 4,506,346, filed by Bennett et al on Dec. 1, 1982, which description is incorporated by reference herein.

Figure 2:
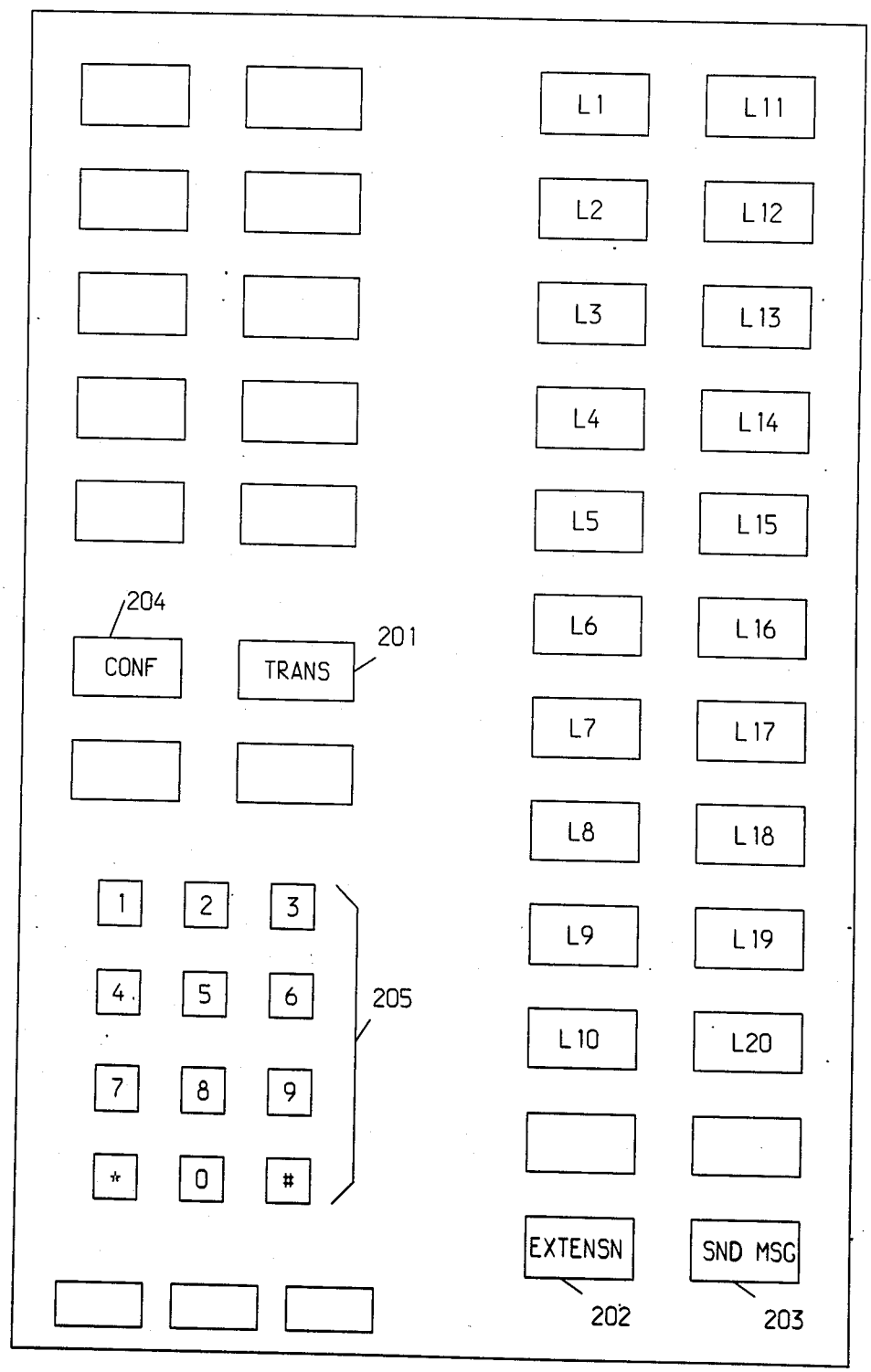
FIG. 2 shows the button arrangement of a station set which may be utilized with the system of FIG. 1.

FIG. 2 shows the button arrangement of a typical attendant station set (e.g., station set 131) for use with the communication system shown in FIG. 1. The attendant station set is connected to control unit 100 via a cable or loop. The station set includes a call Transfer button 201, an Extension button 202, a Send Message button 203, and a Conference button 204 used to initiate various features of the present invention. The key pad 205 provides dialing capability for the station set. In accordance with the present invention, line buttons L1-L20 are arranged to provide both access to lines 111-130 and direct station select (DSS) access to other station sets 132-140 as will be described later. The other buttons on the attendant station set provide other features and functions not relevant to the present invention and hence not illustrated or described.

Before proceeding with the operating description of the present invention, it should be recognized that the present invention may be utilized in a variety of telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system.

Thus, in order to avoid confusion and in order to enable those skilled in the art to practice the claimed invention, this specification will describe the operation of the present invention using the block diagrams of FIGS. 3-6 and table of FIG. 7 which describe the logical steps and the various parameters required to implement the present invention.

With reference to FIGS. 1 and 2, according to the present invention, the line buttons, L1-L20, of station sets 131-140 are used as multi-functional line select buttons. These line select buttons provide a line access function and also are used as station select buttons for calling station sets of the system when a function enable button has previously been pressed. According to the present invention the Transfer button 201, Extension button 202, and Send Message button 203 function enable buttons are used to initiate these normal features and also to act as function change buttons. Hence, pressing a predetermined one of several function transfer buttons (201, 202, 203) changes the function performed by the line select button from a line access function to a station selection function. This station selection function can be implemented using well-known auto-dial or direct station select (DSS) capabilities.

The disclosed embodiment of the present invention utilizes a system having the property that each station is assigned one specific CO line as its primary line. This primary line corresponds to the assigned PBX extension to which the station pertains. This property allows the control unit to remember the mapping of extension numbers to stations. In normal key-like systems, there are generally more stations than lines. In the present system the station to line ratio is optimized for a one to one relationship. Table 7 defines the correlation between the CO lines and the station sets.

While the disclosed embodiment of the present invention utilizes a communication system having a one station per CO line relationship the present invention would work for a "square" configuration where all CO lines appear at all stations. Moreover, the present invention can be modified for operation in systems having other station to CO line ratios. For example, if there is a system having more than one station set on a CO line then the user will have to specify (in the table of FIG. 7) which of those station sets is to be associated with that CO line and the system will need a selective ringing capability to be able to selectively ring only the associated station set. Techniques for selective ringing of station sets is well known in the art. Obviously, if a station set is the only station set on two or more CO lines the user can select (in the table of FIG. 7) that station in one or all of the associated CO lines.

In the table of FIG. 7, each line has associated with it a dial register (e.g., 701) containing an administerable sequence of dial characters or digits. These digits are entered by the user to correspond to the line extension in the host CO switch's 105 dial plan. For example, in FIG. 7 line 01-A0 is associated with station number 3860. Thus, for example, when a function transfer button is pressed and the line button representing line 01 is depressed, the digit string 3860 is dialed on whatever CO line the user happens to be active (off-hook) at that time.

According to the present invention, the line button is used as an auto-dial station select button for dialing or calling stations through host switch (i.e., CO or PBX 105) by pressing Extension button 202 and then pressing the line select button of the station to be called. It should be noted that other button station select arrangements, such as a direct station select (DSS) capability can be implemented for station selection consistent with the teachings of the present invention. Moreover, the conferencing of an additional station to an existing call is accomplished by pressing Conference button 204, Extension button 202 and the line select button of the station to be called. Additionally, an auto-dial station select capability exists for transferring calls through a host switch by first pressing Transfer button 201 and then pressing the line button associated with the station to which the call is to be transferred. A station select capability for illuminating a message waiting LED at other station sets exists by first pressing the Send Message button 203 and then pressing the line button associated with the station where the message waiting LED is to be lit.

The Extension button 202, Transfer button 201 and Send Message button 203 are called function change buttons since they change the function performed by the line select button. If none of these function change buttons are pressed prior to pressing the line button then the standard line answering or line seizing function is performed by the line button.

In the following description the first digit of a reference number indicates the figure on which that reference number is located. Hence, reference number 201 is located on FIG. 2.

Figure 3:
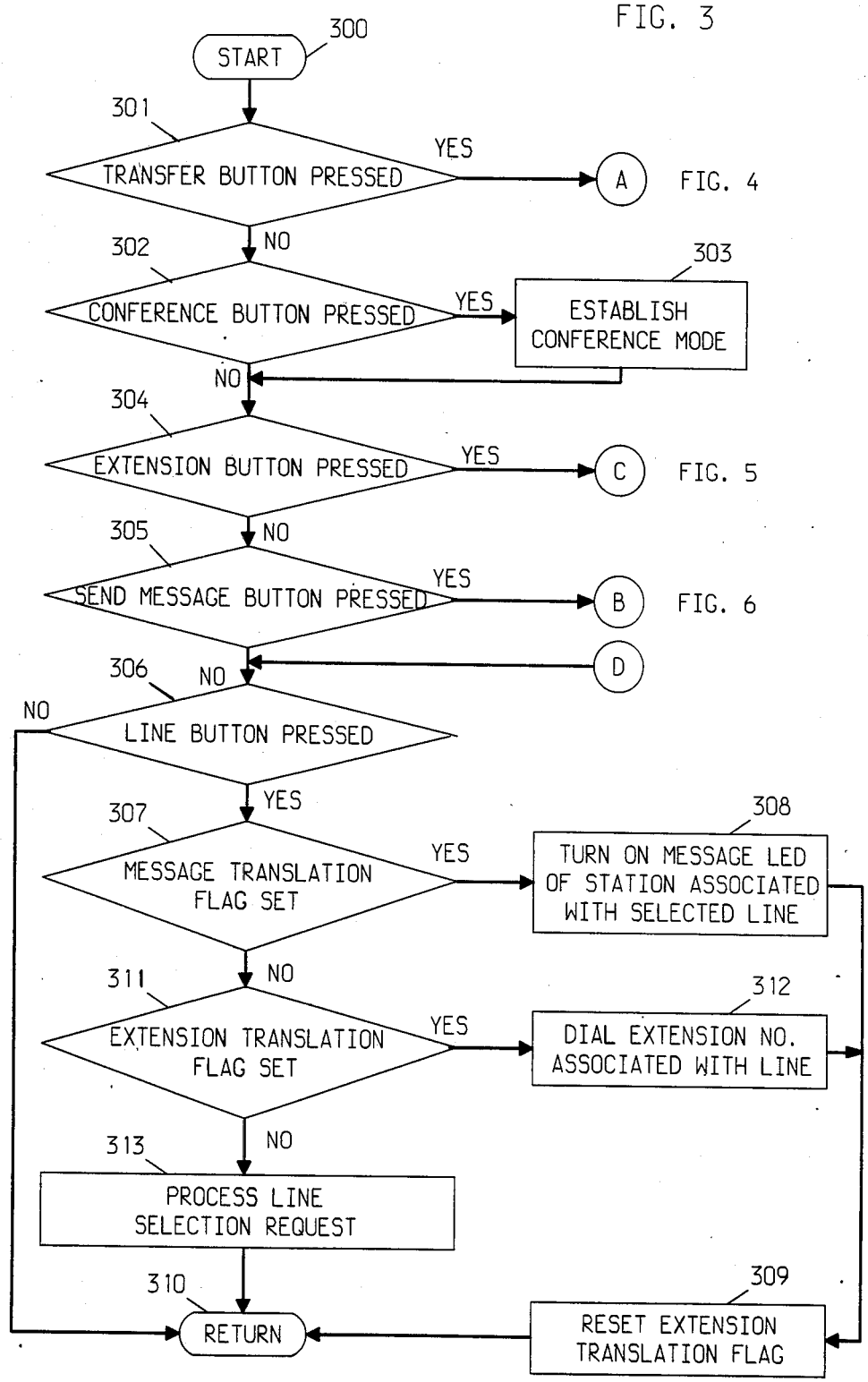
FIG. 3 shows the overall flow chart of the software sequence used to implement the present invention.
Figure 4:
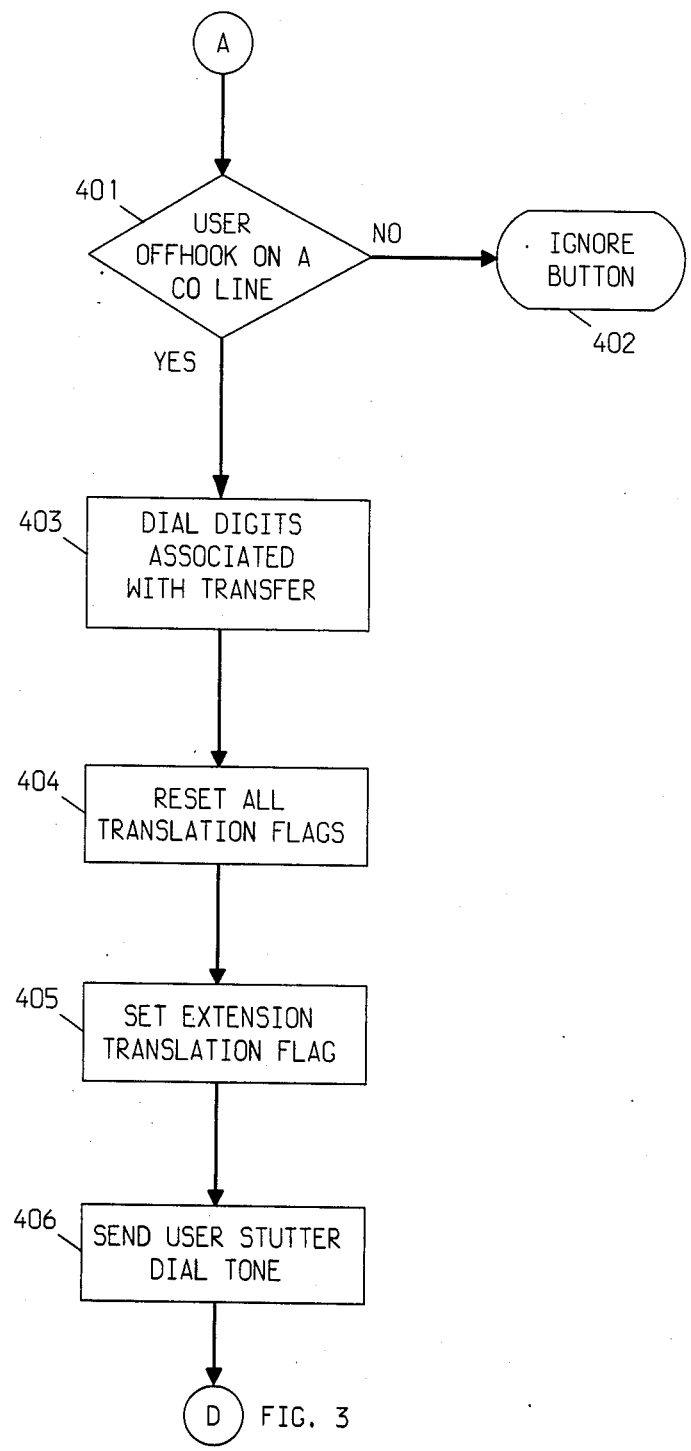

The following description makes joint reference to FIGS. 2, 3 and 4. The line buttons, i.e., L1-20, of station sets 131-140, are typically used to access CO or PBX lines 111-130 to either answer or initiate a call.

Assume that an attendant or user presses Transfer button 201. When any button is pressed the program sequence of FIG. 3 starts, step 300, and determines that the Transfer button has been pressed in step 301. In step 401 the system detects if the user is off-hook on a CO facility. If not, step 402, the Transfer button depression is ignored and control returned to the main program. If, however, the user if off-hook at a CO facility, the system automatically dials the predetermined digits or code associated with the depression of the Transfer button. Host switch 105 receives this code and initiates the well-known call transfer routine. Thereafter, in step 404, all translation flags (i.e., message and extension flags) are reset. The message translation flag, as will be discussed in a later paragraph, is set whenever the Send Message button is pressed. An extension translation indicator flag is then set in step 405. As will be discussed later, this causes the system to treat any subsequent user line button depression as an auto-dial function to the station associated with that line button rather than as the standard line pick-up function.

Thereafter, in step 406, the host switch outputs a special stutter tone to the off-hook station set. The user interprets this stutter tone as a signal to press the line button associated with the station to which the call is to be transferred (step 306). Thus, the line buttons are converted from a line access function to the auto-dial function enabling the user to transfer a call to any station by just pressing the line button associated with that station. If no line button is pressed after a predetermined time control is returned to the main program 310.

If a line button is pressed then, in step 307, the system checks if the message translation flag is set. Since it was previously reset or cleared in step 404 the system checks, in step 311, if the extension translation flag is set. Since this flag was set (during step 405), the system accesses the line-to-station translation table shown in FIG. 7. Using the CO line number of the pressed line button the system accesses the table of FIG. 7 to obtain the extension number of the station associated with the line button pressed by user. In step 312 the system dials the station number obtained from the line-to-station translation table of FIG. 7. When the called party answers, the user announces to the called party that this call has been transferred. In step 309, the system resets the extension translation flag to prevent subsequent line pick-up operations from being interpreted as a call transfer request. In step 310 the sequence ends and control is returned to the main program of the system.

According to the present invention, the line buttons auto-dial capability can also be initiated during the conference feature. When a user is off-hook on an active call, pressing the Conference button 204 signals control unit 100, step 302, that a conference call is to be made. System control unit 100 takes the appropriate well-known actions 303 to establish the conference mode of operation. Thereafter, when the user presses the extension button followed by a line select button this results in adding a call to the auto-dialed station of the conference call.

Besides operating in conjunction with the Conference button, the Extension button 202 can be utilized together with the line buttons (L1-L30) as a feature to "auto-dial" the stations associated with the line buttons. Thus, when a user goes off-hook to initiate a call, pressing the Extension button 202 followed by a line select button results in an auto-dialed call to the station associated with that line select button. Pressing the Extension button 202 causes the routine shown in FIGS. 3 and 5 to proceed from step 304. Since the Conference button 204 was pressed, the program sequences through to step 304 and then to FIG. 5 where in step 501 it checks if the user if off-hook at a CO facility or line. If user is not off-hook at a CO line the Extension button depression is ignored, step 502, and control is returned to the main program. If the user is off-hook at a CO line the program resets the translation flags, step 503, and then sets the extension translation flag, step 504. Thereafter, in step 306 of FIG. 3, the system waits for the user to select the line button associated with the station to be auto-dialed. If no line button is depressed within a fixed time the sequence ends, step 310, and control is returned to the main program. If a line button is pressed, the status of the message translation flag is checked. Since the message flag was reset, in step 503, and the extension flag set, in step 502, the sequence steps through steps 307 and 311 to step 312. In step 312 the sequence accesses the line-to-station translation table, shown in FIG. 7, to determine the extension number of the station associated with the line button pressed by user. This extension number is then auto-dialed by the system.

Finally, according to the present invention, the line button can be used as a DSS button for the Send Message feature. The Send Message feature illuminates the message waiting LED next to the Message button at the selected station indicating that a message is waiting. This capability is enabled by a user pressing the Send Message button 203. The program then sequences through steps 300 through 305 and then to FIG. 6 where and in step 601 all translation flags are reset. The sequence then sets the message flag in step 602 and awaits the user selection of a line button in step 306. If no line button is pressed within a certain time period, control is returned to the main program in step 308.

When the user presses a line button, since the message translation flag is set, step 307, the system accesses the line-to-station translation table of FIG. 7, to determine the extension number of the station associated with that line button. In step 308, the system sends a command to the selected station which causes the message waiting LED at that station to light.

If neither the Extension, Transfer, nor Send Message button precedes the line select button operation, the program sequences through steps 300-307 and 311. In step 313 the line button depression is treated as the standard line selection function, i.e., connecting the station set to the line associated with the line button depressed.

While the system described herein was described as connected behind a PBX or CO Centrex arrangement it should be noted that the present invention would work when connected to a CO office. In such an arrangement the multiple line select buttons of the station sets would correspond to separate loop connections between the station sets and control unit 100. Typically only one station set is connected to each loop. By pressing the Extension button, Transfer button or Send Message button followed by a line select button would provide an auto-dial station selection capability within the system without signaling through the external PBX or CO centrex.

What has been described is merely illustrative of the application of the principles of the present invention. Other methods, sequences or circuits can be used to implement the present invention by those skilled in the art without departing from the spirit and scope of the present invention.

What is claimed is:

1. A telephone communication system comprising
   a control unit connected to a plurality of external communication lines,
   a plurality of station sets connected over communication loops to said control unit, each station set including,
   a plurality of line select buttons, each line select button enabling a connection to a predetermined line and each line select button selectively associated with a predetermined one of said station sets during a predetermined system feature,
   a function enable button arranged for initiating a predetermined system feature when depressed and arranged for changing the function performed by a subsequently depressed line select button from a line access function to a station select function in said communication system, and
   said control unit including,
   means responsive to a depression of said function button followed by a depression of one of said line select buttons at a station set for establishing said feature and means for signaling the station set associated with said depressed line select button.

2. The telephone communication system of claim 1 wherein said function button is a send message button and said signaling means sends a message waiting signal to the station set associated with said depressed line select button.

3. The telephone communication system of claim 1 wherein said function button is a call transfer button and said signaling means sends a ringing signal to the station set associated with said depressed line select button.

4. The telephone communication system of claim 3 wherein an acknowledgement signal is sent to the station set at which said call transfer button was pressed.

5. The telephone communication system of claim 1 wherein said function button is an extension button and said signaling means sends a ringing signal to the station set associated with said depressed line select button.

6. The telephone communication system of claim 1 wherein each station set has a primary line associated therewith.

7. The telephone communication system of claim 1 wherein one of said station sets further includes a conference button and said control further includes means responsive to a depression of said conference button at said station during an established call, followed by a depression of said extension button, and a depression of one of said line select buttons for conferencing the station set associated with said depressed line select button to said established call.

8. A communication system control unit connected to a plurality of external communication lines and connected over communication loops to a plurality of stations sets, a station set including line select buttons, each line select button generating a signal requesting a connection to a predetermined communication line and having each line select button associated with a different one of said station sets, and said station set including a function enable button for generating a signal requesting a predetermined communication function, said control unit comprising table means for storing a telephone number of the station set associated with each line select button and station communication means responsive to a function enable button signal and a subsequent line select button signal received from said station set for accessing said table for the telephone number of the station set associated with said received line select button signal and for establishing therewith the communication function defined by said function enable button signal.

9. The control unit of claim 8 wherein said function enable signal is a call transfer signal and said station communication means includes means for dialing the telephone number of the station set associated with said received line select signal.

10. The control unit of claim 8 wherein said function enable signal is an extension dial signal and said station communication means includes means for dialing the telephone number of the station set associated with said received line select signal.

11. The control unit of claim 8 wherein said function enable signal is a send message signal and said station communication means includes means for sending a message waiting signal to the station associated with said received line select signal.

12. The control unit of claim 8 wherein said function enable signal is a conference signal followed by an extension signal and said station communication means includes means for dialing the telephone number of the station set associated with said received line select signal.

13. A method of operating a communication system control unit connected to a plurality of external communication lines and connected to a plurality of multiple line select button station sets, the method comprising the steps of:

associating each line select button at said station sets with a different one of said station sets, receiving a function enable signal and a line select button signal from one of said station sets to said control unit, and establishing the communication function defined by said function enable signal at the station set determined from said associating step using said line select button signal.

* * * * *